United States Patent [19]

Ladds et al.

[11] 4,155,643

[45] May 22, 1979

[54] RECEIVER TRAY FOR PHOTOCOPY MACHINES

[75] Inventors: Malcolm L. Ladds, Ottawa; Wayne Regimbald, Glen Isle, both of Canada

[73] Assignee: Dennison Manufacturing Company, Framingham, Mass.

[21] Appl. No.: 842,615

[22] Filed: Oct. 17, 1977

[51] Int. Cl.[2] .......................... G03B 27/58; B65H 31/00

[52] U.S. Cl. .......................................... 355/72; 271/207

[58] Field of Search ................ 355/72, 75, 3 R, 35 H; 271/207

[56] References Cited

U.S. PATENT DOCUMENTS

| | | | |
|---|---|---|---|
| 3,154,356 | 10/1964 | Lewis et al. | 271/207 |
| 3,873,196 | 3/1975 | Ogawa | 355/3 R |

FOREIGN PATENT DOCUMENTS

| | | | |
|---|---|---|---|
| 2309075 | 8/1974 | Fed. Rep. of Germany | 355/72 |
| 81911 | 8/1919 | Switzerland | 271/207 |

*Primary Examiner*—Donald A. Griffin
*Attorney, Agent, or Firm*—Kenneth D. Hudson

[57] ABSTRACT

An improved photocopy receiver tray is disclosed to minimize misstacking and jams. The tray comprises means for mounting to a photocopy machine, a bottom, and rear means for arresting copies, the bottom being divided into a front portion and a lower rear portion separated from the front portion by a step, the rear portion, step and arresting means defining a pocket for stacking at least one size copies. Preferably the tray bottom declines toward the arresting means, and guide means are provided at the machine copy exit for directing copy over and out of contact with a substantial part of the front portion of the tray bottom.

7 Claims, 4 Drawing Figures

RECEIVER TRAY FOR PHOTOCOPY MACHINES

BACKGROUND OF THE INVENTION

This invention relates to electrophotography and more particularly to receiver trays for receiving and stacking photocopies delivered from a photocopy machine.

Electrophotographic processes and machines are well known and feed a succession of record members, typically paper, through a series of steps to form a visible image thereon and deliver the finished copies to a receiver tray for stacking. Substantial voltages are applied to the copies to form or transfer images thereon and frictional contact in feeding the copies through the machine can provide additional charge. When successive copies are delivered to the receiver tray for stacking these charges, together with frictional forces, can cause misstacking in the tray or paper jams in the machine.

It is accordingly the principal object of the present invention to provide an improved receiver tray for receiving and stacking photocopies which reduces misstacking and jams. Further objects include provision of a photocopy receiver tray which minimizes sliding contact of a delivered copy with the tray surface and the surface of preceding copies, which is capable of receiving and stacking at least two sizes of copies, and which provides a pocket for receiving and stacking at least one size of copy in the bottom of the tray.

SUMMARY OF THE INVENTION

According to the present invention, the improved receiver tray for photocopies delivered along a path from a photocopy machine comprises means for mounting the tray to the machine in position to receive copies, a bottom having front and rear portions with respect to said path, and means adjacent the rear of the tray for arresting the copies, the rear portion of the tray bottom being below the front portion to form a step therebetween, said rear portion together with said step and arresting means defining a pocket adapted for receiving and stacking at least one size of photocopy therein below the surface of the front portion. Preferably, the tray bottom declines toward the arresting means, and guide means are provided for the photocopies above the front edge of the tray bottom member, the guide means having an upper surface below said path and forming an acute angle therewith having its apex at the trailing edge of the surface with respect to said path, the trailing edge of the guide member projecting the leading edge of the delivered copy over and out of contact with a substantial part of the front portion of the tray bottom. Most preferably, the receiver tray is mounted to the exterior of a wall of the photocopy machine, the machine wall having therein an exit slot, and the guide means is transversely disposed in the exit slot.

DESCRIPTION OF PREFERRED EMBODIMENTS

Figure 1:
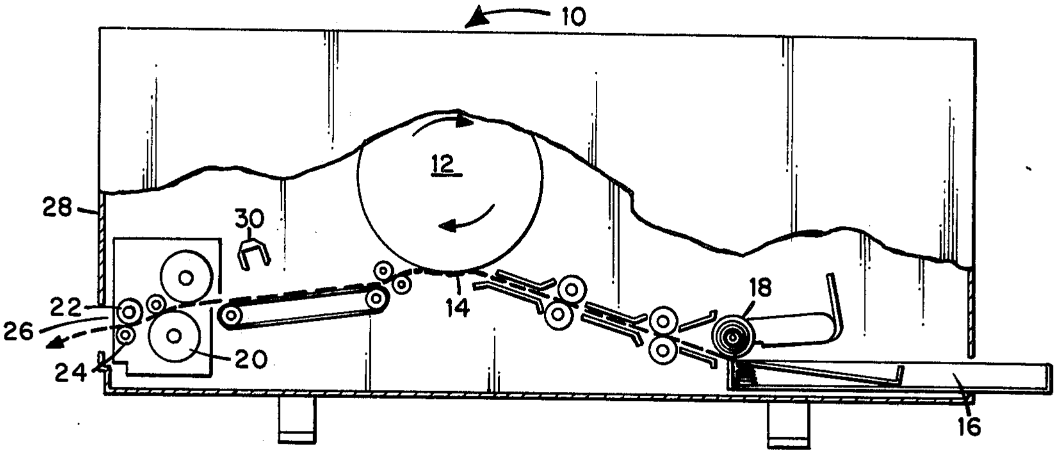
FIG. 1 is a schematic side view of a photocopy machine with parts broken away to illustrate the paper path.

Referring to the drawings, FIG. 1 illustrates a typical electrophotographic copy machine 10 which forms a toned image on photosensitive drum 12 by convention means (not shown) and transfers the toned image to copy paper at 14. The paper is fed along the path shown in broken lines from a paper feed tray 16 by means of feed wheels 18 to transfer station 14. The copy is then advanced to heater roll 20 which fuses the toner, and thence through exit rolls 22, 24 which feed the finished copy out of the machine through exit slot 26 in end wall 28. Typically, a substantial DC voltage is applied to the copy paper at station 14 by means of corona (not shown) to transfer the toner from the drum 12 to the copy paper. Frequently, an AC corona such as shown at 30 is thereafter applied to the copy paper to dissipate or minimize charge. After exiting from exit slot 26 the completed copies fall into receiver tray 32 as shown in FIG. 2.

Figure 2:
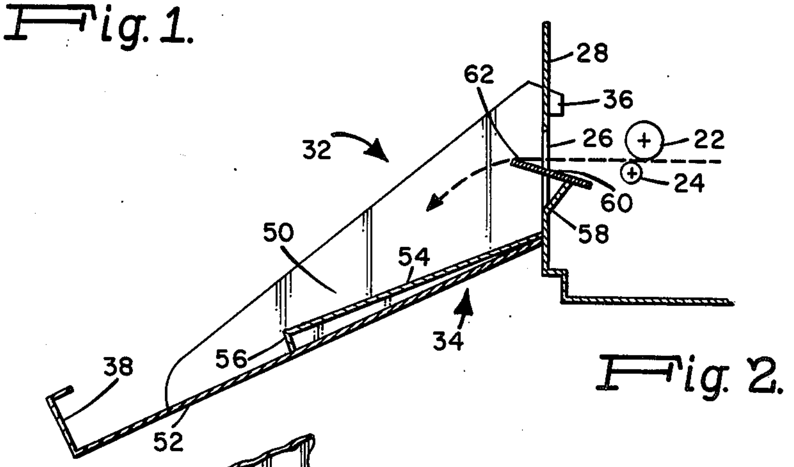
FIG. 2 is a vertical section to enlarged scale of the exit portion of the machine of FIG. 1 having a receiver tray according to the present invention mounted thereto.
Figure 4:
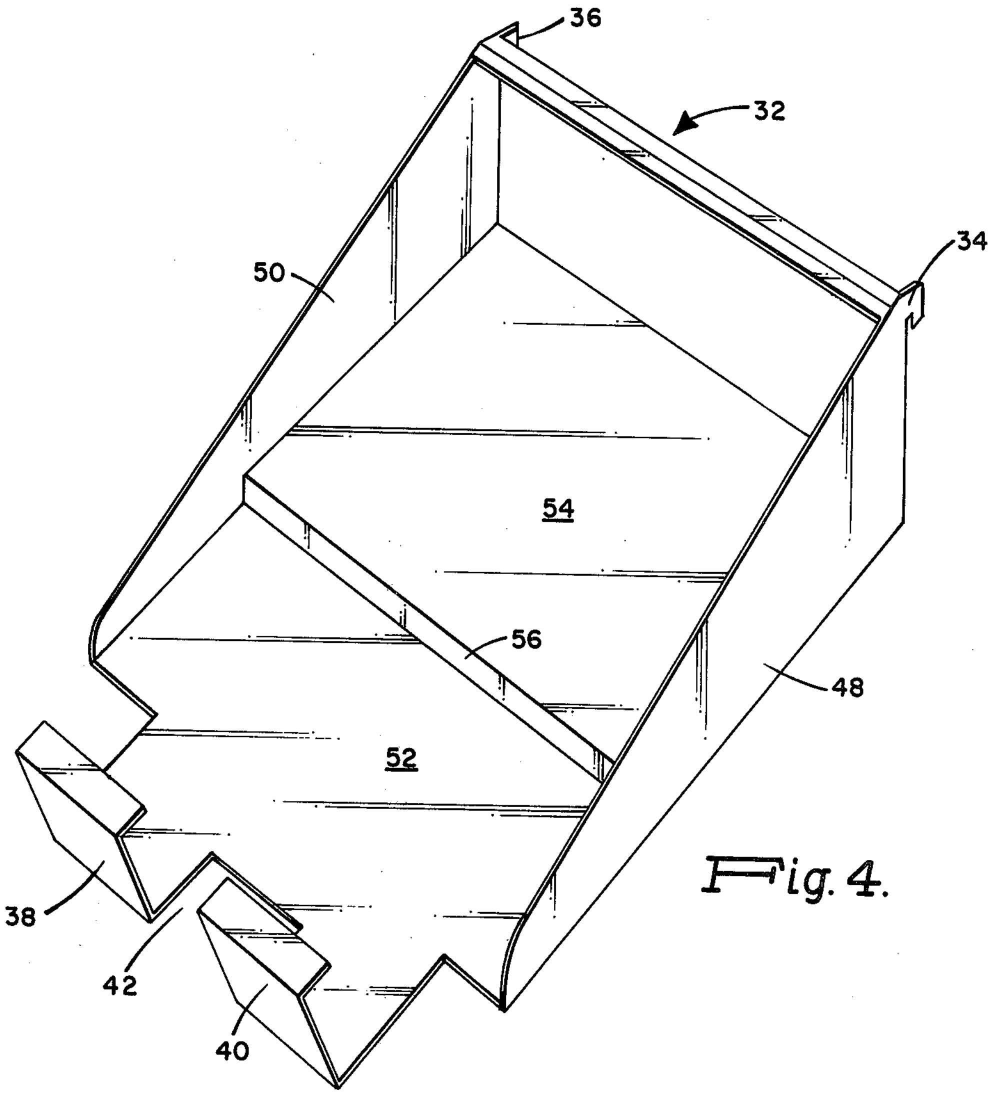

The receiver tray 32 is shown in FIGS. 2 and 4 and comprises hooks 35 and 36, bottom 34 and a pair of upturned stops 38 and 40 for arresting motion of the delivered photocopies. Stops 38 and 40 are separated by slot 42 which allows the copies to be grasped for removal. Hooks 35 and 36 fit within slots 44 and 46 of machine end wall 28 and are formed as extensions of side members 48 and 50, the forward edges of which abut end wall 28. The hooks 35, 36 and the forward edges of side members 48 and 50 serve as means for removably mounting the tray to the machine in position to receive copies, and are preferably adapted as shown to dispose the tray bottom 34 at a downward tilt or decline toward stops 38, 40 to aid by gravity delivery of copies to the stops.

Tray bottom 34 comprises, with respect to the copy path shown, rear portion 52 and front portion 54, the portion 52 being below the portion 54 to form between them a step 56. Portion 52, together with step 56 and stops 38, 40 define a pocket for receiving and stacking at least one size of photocopies therein below the surface of front portion 54. Step 56 is preferably of a height of one-half inch or more sufficient to stack a substantial number of copies in the pocket.

The surface of front portion 54 is preferably polished, waxed or otherwise provided with a low friction surface and is preferably of a length at least equal to the length of portion 52. Portion 52 is sized to receive and stack the most common size of copy, for example $8\frac{1}{2}\times 11$ inches. Larger copies bridge the step 56 and rest for stacking partly over portion 54.

The bottom portions 52 and 54 can be integrally formed, or portion 54 can comprise an insert as shown fitting over a forward extension of portion 52. Step 56 can be disposed at any suitable angle but is preferably substantially perpendicular to the surface of portion 52 as shown. It preferably comprises a solid wall but may be left partly or wholly open, if desired.

Figure 3:
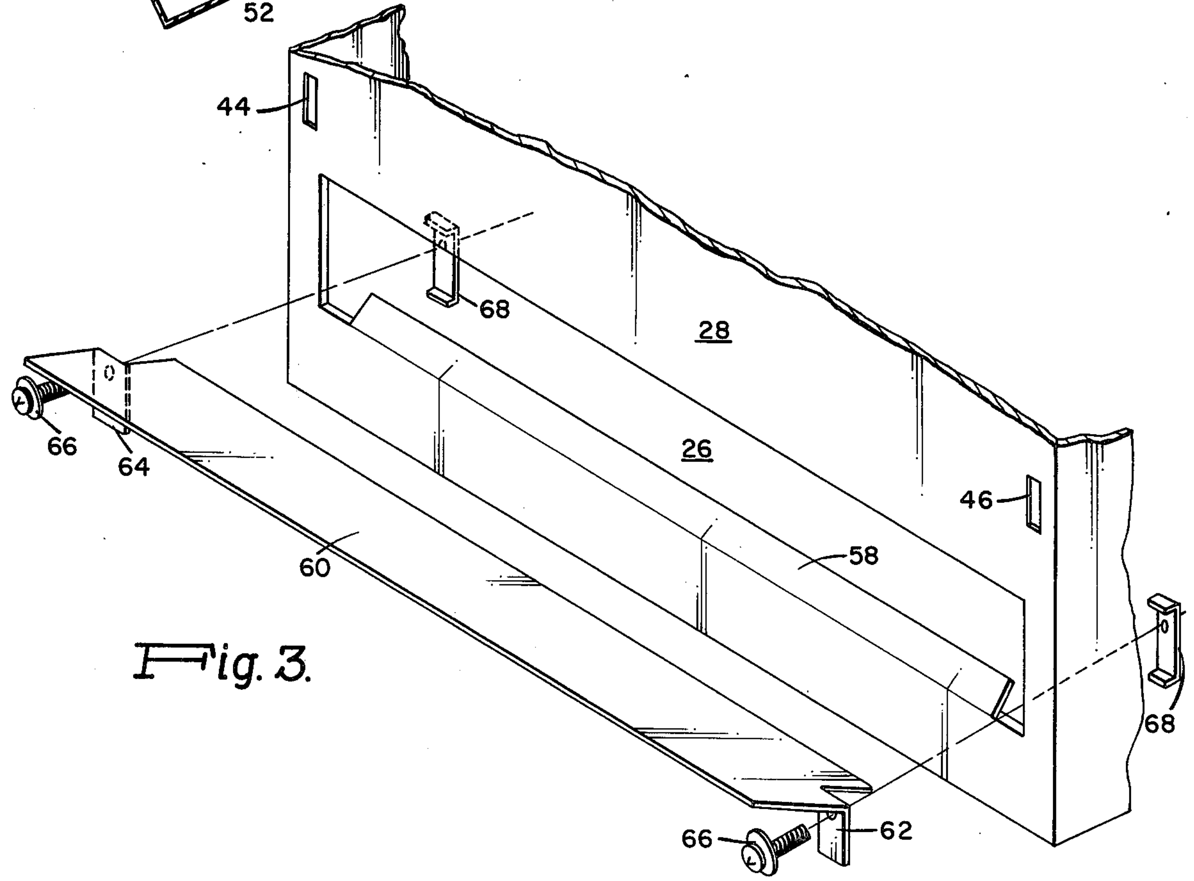
FIG. 3 is an exploded perspective view of the exit portion of the photocopy machine illustrated in FIGS. 1 and 2; and, FIG. 4 is a perspective view of the receiver tray shown in FIG. 2.

To further minimize misstacking and jams, it is preferred to employ a guide member 60 (FIGS. 2 and 3) which directs the delivered copy over and out of contact with a substantial part of the front portion 54 of tray bottom 34. Guide member 60 is transversely disposed in the exit slot 26 of machine end wall 28 and over the front edge of tray bottom 34. Its upper surface is below the delivery path of the copy and forms therewith an acute angle having its apex at the trailing edge 62. Any sag in the leading edge of a photocopy being delivered by exit rolls 22, 24 will contact the smooth upper surface of member 60 and be directed to edge 62. Thereafter, the copy wll contact substantially only edge 62 to minimize friction and drag and the beam strength of the copy paper will cause it to advance well out and over tray bottom portion 54, further reducing contact and friction with the latter.

Guide member 60 can be mounted over tray bottom 34 and transversely of slot 26 in any suitable manner. If desired, it can be mounted to the tray, for example, between side walls 48, 50. As shown, it is provided with depending legs 62, 64 which are secured in abutment with machine end wall 28 below slot 26 by means of screws 66 and clamps 68. As shown, exit slot 26 has a lower inturned lip 58 on which the member 60 may rest. Such lips are sometimes provided but are not required.

As can be seen from FIG. 2, the delivered copy is advanced by rolls 22, 24 through slot 26, over edge 62, and out and over a substantial part of surface 54. When free of rolls 22, 24 the copy will contact the lower portion of surface 54 and fall by momentum and gravity into pocket 52, arresting at stops 38, 40. Frictional contact, and misstacking and jams, are minimized. The improvement is sufficient in some cases to allow discharging AC corona 30 to be omitted.

It should be understood that the foregoing description is for the purpose of illustration and that the invention includes all equivalents and modifications within the scope of the appended claims.

What is claimed is:

1. A receiver tray for photocopies delivered along a path from a photocopy machine, said tray comprising means for mounting the tray to said machine in position to receive copies, a bottom having front and rear portions with respect to said path, and means adjacent the rear of the tray for arresting the copies, said bottom rear portion being below the front portion to form a step therebetween, the rear portion together with said step and arresting means defining a pocket adapted for receiving and stacking at least one standard size of photocopies therein, said step extending substantially across the tray and being of a depth sufficient to stack a substantial number of said copies in the pocket out of contact with said front portion.

2. A receiver tray according to claim 1 wherein said mounting means is adapted to dispose the tray with its bottom declining toward the arresting means.

3. A receiver tray according to claim 2 wherein said front portion comprises an insert of sheet material located above and spaced from a frontward extension of said rear portion.

4. A receiver tray according to claim 2 wherein said step is at least about one-half inch in height.

5. A receiver tray mounted to a photocopy machine for receiving and stacking photocopies delivered along a path from said machine, said machine comprising an end wall having an exit slot and a guide member for said copies transversely disposed in said slot, said guide member having an upper surface below said path and forming therewith an acute angle having its apex at the trailing edge of the surface with respect to the path, said tray comprising means for mounting the tray to said end wall in position to receive and stack said copies, a bottom declining from said end wall and having front and rear portions with respect to said path, and means adjacent the rear edge of the tray for arresting said copies, the rear portion of the bottom member being below the front portion thereof to form a step therebetween of at least about one-half inch in height and extending substantially across said tray, the rear portion together with said step and arresting means forming a pocket adapted for receiving and stacking at least one standard size of photocopies therein below the surface of said front portion, the trailing edge of said guide means being above the bottom surface of the tray.

6. A receiver tray for photocopies delivered along a path from a photocopy machine, said tray being mounted to the delivery portion of said photocopy machine and comprising means for mounting the tray to said machine in position to receive copies, a bottom having front and rear portions with respect to said path, and means adjacent the rear of the tray for arresting the copies, said bottom rear portion being below the front portion to form a step therebetween, the rear portion together with said step and arresting means defining a pocket adapted for receiving and stacking at least one standard size of photocopies therein, said step extending substantially across the tray and being of a depth sufficient to stack a substantial number of said copies in the pocket out of contact with said front portion, said machine having located at its copy exit a guide member with an upper surface below said path and forming an acute angle therewith having its apex at the trailing edge of said surface with respect to said path, whereby the delivered copy contacts substantially only the trailing edge of said surface, said trailing edge being above the bottom member of said tray to project the leading edge of the delivered copy over and out of contact with substantial part of the front portion of the tray bottom.

7. A receiver tray according to claim 6 wherein said photocopy machine copy exit comprises a delivery slot in a wall thereof, said guide member being transversely disposed in said slot.

* * * * *